United States Patent
Yokochi et al.

(10) Patent No.: US 9,892,641 B2
(45) Date of Patent: Feb. 13, 2018

(54) REGULATORY INFORMATION NOTIFYING DEVICE AND METHOD

(71) Applicant: HONDA MOTOR CO., LTD., Tokyo (JP)

(72) Inventors: Yuji Yokochi, Wako (JP); Izumi Takatsudo, Wako (JP); Shinnosuke Saito, Wako (JP); Hiroki Nakajima, Wako (JP); Yoshinori Kinoshita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/388,161

(22) Filed: Dec. 22, 2016

(65) Prior Publication Data

US 2017/0178507 A1    Jun. 22, 2017

(30) Foreign Application Priority Data

Dec. 22, 2015  (JP) ................................. 2015-249326

(51) Int. Cl.
  *G08G 1/09* (2006.01)
  *G08G 1/0967* (2006.01)
  *B60K 31/18* (2006.01)
  *G08G 1/0962* (2006.01)

(52) U.S. Cl.
  CPC ......... *G08G 1/09675* (2013.01); *B60K 31/18* (2013.01); *G08G 1/09623* (2013.01); *G08G 1/096716* (2013.01); *G08G 1/096783* (2013.01)

(58) Field of Classification Search
  CPC .... G08G 1/09675; G08G 1/166; G08G 1/127; G08G 1/096716; G08G 1/161; G06K 9/00805; G06K 9/00818; G06K 9/00791; B60K 31/18
  See application file for complete search history.

(56) References Cited

U.S. PATENT DOCUMENTS

2014/0139670 A1*  5/2014  Kesavan ............ G06K 9/00791
                                                        348/148

FOREIGN PATENT DOCUMENTS

| JP | 2004-348287 A | 12/2004 |
|---|---|---|
| JP | 2008-59458 A | 3/2008 |
| JP | 2008-304296 A | 12/2008 |
| JP | 2009-110394 A | 5/2009 |
| JP | 2010-79449 A | 4/2010 |
| JP | 2011-108175 A | 6/2011 |

(Continued)

OTHER PUBLICATIONS

Office Action dated Sep. 5, 2017, issued in counterpart Japanese Application No. 2015-249326, with English translation (8 pages).

*Primary Examiner* — Kabir A Timory
(74) *Attorney, Agent, or Firm* — Westerman, Hattori, Daniels & Adrian, LLP

(57) ABSTRACT

The regulatory sign or traffic information presented on a roadway is detected by capturing an image of ahead of a vehicle, and also the regulatory information is detected by receiving a signal transmitted from outside the vehicle. When the regulatory information is detected from the signal transmitted from outside the vehicle, that regulatory information is notified. When no regulatory information is detected from the signal transmitted from outside the vehicle, the regulatory information detected by capturing the image of ahead of the vehicle is notified.

7 Claims, 10 Drawing Sheets

(56) References Cited

FOREIGN PATENT DOCUMENTS

| JP | 2012-68694 A | 4/2012 |
| JP | 2013-159117 A | 8/2013 |
| JP | 2015-215738 A | 12/2015 |

* cited by examiner

REGULATORY INFORMATION NOTIFYING DEVICE AND METHOD

CROSS REFERENCES TO RELATED APPLICATIONS

The present application claims priority under 35 U.S.C. § 119 to Japanese Patent Application No. 2015-249326, filed Dec. 22, 2015, entitled "Regulatory Information notifying device and Method." The contents of this application are incorporated herein by reference in their entirety.

BACKGROUND

1. Field

The present disclosure relates to a regulatory information notifying device and method that enable regulatory information of a road sign or a road marking to be displayed on a display unit in a vehicle compartment.

2. Description of the Related Art

Recently, vehicles have been mounted with a device that displays regulatory information of a road sign or a road marking on a display unit in a vehicle compartment. For example, Japanese Unexamined Patent Application Publication No. 2009-110394 describes a device that detects regulatory information from an image of a road sign captured by an in-vehicle camera and displays the detected regulatory information on a display unit (see claim 1, paragraphs [0037] to [0043], and the like).

In addition, road-to-vehicle communication is sometimes executed between an in-vehicle radio receiver and a radio transmitter (such as a beacon) provided along a road. When the radio transmitter is capable of transmitting the regulatory information, the regulatory information can also be detected by receiving a transmitted signal with the radio receiver. For example, Japanese Unexamined Patent Application Publication No. 2010-79449 describes a device that detects regulatory information transmitted from a radio transmitter by a radio receiver and displays the detected regulatory information such as speed limit information on a display unit (see paragraphs [0013], [0031], and the like).

SUMMARY

To increase the reliability, regulatory information such as of traffic sign and traffic signal existing on a road ahead of a traveling vehicle is preferably detected by multiple methods. Detecting the regulatory information by both an in-vehicle camera and a wireless communication through a wireless communicator such as a radio transmitter and/or receiver between the vehicle and the outside of the vehicle (typically, a signal transmitter provided on the road) is considered preferable. In such a case, it is necessary to consider which should be displayed on a display unit, the regulatory information detected by the camera, or the regulatory information detected by the wireless communication device.

The present application describes a regulatory information notifying device and method that enable appropriate regulatory information based on regulatory information detected by a camera and regulatory information detected by a road-to-vehicle communication to be displayed.

A regulatory information notifying device according to the application includes: a regulatory information detecting unit that detects regulatory information presented on a roadway in front of a vehicle; a notifying unit that notifies an occupant (typically, a driver of the vehicle) of the regulatory information detected by the regulatory information detecting unit; and a controlling unit that controls the notifying unit, wherein the regulatory information detecting unit includes an image capturing and detecting unit that captures an image of ahead of the vehicle and detects the regulatory information, and a communication detecting unit that receives a signal transmitted from outside the vehicle and detects the regulatory information, and when the communication detecting unit detects the regulatory information, the notifying unit notifies the occupant of the regulatory information detected by the communication detecting unit, in accordance with instructions of the controlling unit, and when the communication detecting unit does not detect the regulatory information, the notifying unit notifies the occupant of the regulatory information detected by the image capturing and detecting unit, in accordance with the instructions of the controlling unit.

When the regulatory information is detected from the captured image of the road sign or the road marking in a situation where the road sign is partially obscured by a tree or the road marking has been partially erased, the sign may be misidentified. In addition, the road sign for a side road may be misidentified as a road sign for the roadway. On the other hand, when the regulatory information is detected by the road-to-vehicle communication, no misidentification occurs. According to the present application, when the road-to-vehicle communication, that is, detection of the regulatory information is performed by the communication detecting unit, the regulatory information detected by the communication detecting unit is notified with priority. On the other hand, when the communication detecting unit does not detect the regulatory information, the occupant is notified of the regulatory information detected by the image capturing and detecting unit. In this way, the occupant can be continuously notified of the appropriate regulatory information.

In the present application, out of the regulatory information, the image capturing and detecting unit and the communication detecting unit detect speed limit information indicating a speed limit of the roadway and regulatory information other than the speed limit information, and when the communication detecting unit detects the speed limit information, the notifying unit concurrently notifies the occupant of the speed limit information detected by the communication detecting unit and the regulatory information other than the speed limit information detected by the image capturing and detecting unit, in accordance with the instructions of the controlling unit, and when the communication detecting unit does not detect the speed limit information, the notifying unit notifies the occupant of the speed limit information and the other regulatory information detected by the image capturing and detecting unit, in accordance with the instructions of the controlling unit.

Of the regulatory information, the speed limit information is presented on a section of the roadway that is comparatively long. Thus, provision of information is not affected notably even when notification of the speed limit information is delayed. Preferably, for the speed limit information, high information accuracy has priority over timely notification. Meanwhile, some of the other regulatory information set by the road sign and the road marking is presented on a predetermined position. When the other regulatory information is presented on the predetermined position, the occupant has to be notified of the other regulatory information at an appropriate position. Thus, the other regulatory information requires timely notification.

As with the present application, the information accuracy of the notified speed limit can be enhanced by notifying the occupant of the speed limit information detected by the communication detecting unit with priority over the speed limit information detected by the image capturing and detecting unit. In addition, the occupant can be notified of the other regulatory information other than the speed limit information at the appropriate position with no delay by notifying the occupant of the regulatory information in front of the vehicle detected by the image capturing and detecting unit.

In the present application, the communication detecting unit detects the speed limit information by executing road-to-vehicle communication with a wireless transmitter previously placed on the roadway, and when the communication detecting unit detects the speed limit information, the notifying unit does not notify the occupant of the other regulatory information that is part of the other regulatory information detected by the image capturing and detecting unit and is not presented on the roadway on which the wireless transmitter is placed, in accordance with the instructions of the controlling unit.

It is expected that the wireless transmitter that transmits the regulatory information via the road-to-vehicle communication will be placed on a highway, with priority. Thus, when the road-to-vehicle communication is executed, the vehicle is assumed to be travelling on the highway. To be more specific, when the image capturing and detecting unit detects the other regulatory information that is less likely to be set on the highway, the other regulatory information is assumed to be set on a road other than the roadway of the vehicle, such as a side road. According to the present application, when the communication detecting unit detects the speed limit information, the other regulatory information that is not part of the regulatory information detected by the image capturing and detecting unit and is not set on the roadway at which the wireless transmitter is placed is not notified. This can prevent notifying the occupant of wrong information as a result of misidentification of the road sign for the side road as a road sign for the roadway.

In the present application, when the communication detecting unit detects the speed limit information, the notifying unit does not notify the occupant of the other regulatory information regarding a stop sign detected by the image capturing and detecting unit, in accordance with the instructions of the controlling unit.

According to the present application, for example, when the vehicle travels on the highway on which the road-to-vehicle communication is executed, misidentification of the stop sign placed at the side road as the regulatory information for the roadway of the vehicle can be prevented. Thus, the occupant is less likely to have a strange experience.

In the present application, the notifying unit includes a display unit that displays the regulatory information detected by the image capturing and detecting unit and the communication detecting unit, the communication detecting unit detects speed limit information indicating a speed limit of the roadway and traffic light information indicating a signal state of a traffic light in front of the vehicle out of the regulatory information by executing road-to-vehicle communication with a wireless transmitter previously provided on the roadway, and when the communication detecting unit does not detect the speed limit information or the traffic light information, the notifying unit displays the regulatory information detected by the image capturing and detecting unit and vehicle information set by the occupant, in accordance with the instructions of the controlling unit, and when the communication detecting unit detects the speed limit information and the traffic light information, the notifying unit displays the speed limit information and the traffic light information detected by the communication detecting unit, in accordance with the instructions of the controlling unit.

According to the present application, the speed limit information and the traffic light information detected by the communication detecting unit can be displayed with priority, and thereby the occupant can be alerted with highly accurate information.

A regulatory information notifying method according to the present application includes: an image capturing and detecting step of capturing an image of ahead of the vehicle and detecting the regulatory information presented on a roadway; a communication detecting step of receiving a signal transmitted from outside the vehicle and detecting the regulatory information; and a notifying step of notifying an occupant of the regulatory information detected in the communication detecting step when the regulatory information is detected in the communication detecting step and notifying the occupant of the regulatory information detected in the image capturing and detecting step when the regulatory information is not detected in the communication detecting step.

According to the present application, when the regulatory information is detected by the road-to-vehicle communication, that is, in the communication detecting step, a notification of the regulatory information detected by the road-to-vehicle communication is made with priority. On the other hand, when no regulatory information is detected in the communication detecting step, a notification of the regulatory information detected in the image capturing and detecting step is made. In this way, the occupant can be continuously notified of the appropriate regulatory information.

According to the present application, an occupant can be continuously notified of appropriate regulatory information by notifying the occupant of the road-to-vehicle communication with priority over the regulatory information detected by image capturing. The word "unit" used in this application may mean a physical part or component of computer hardware or any device including a controller, a processor, a memory, etc., which is particularly configured to perform functions and steps disclosed in the application.

DESCRIPTION OF THE PREFERRED EMBODIMENTS

Hereinafter, preferred embodiments of a regulatory information notifying device and method according to the present application are described in detail with reference to the accompanying drawings.

[1. Interior of Vehicle 10]

Figure 1:
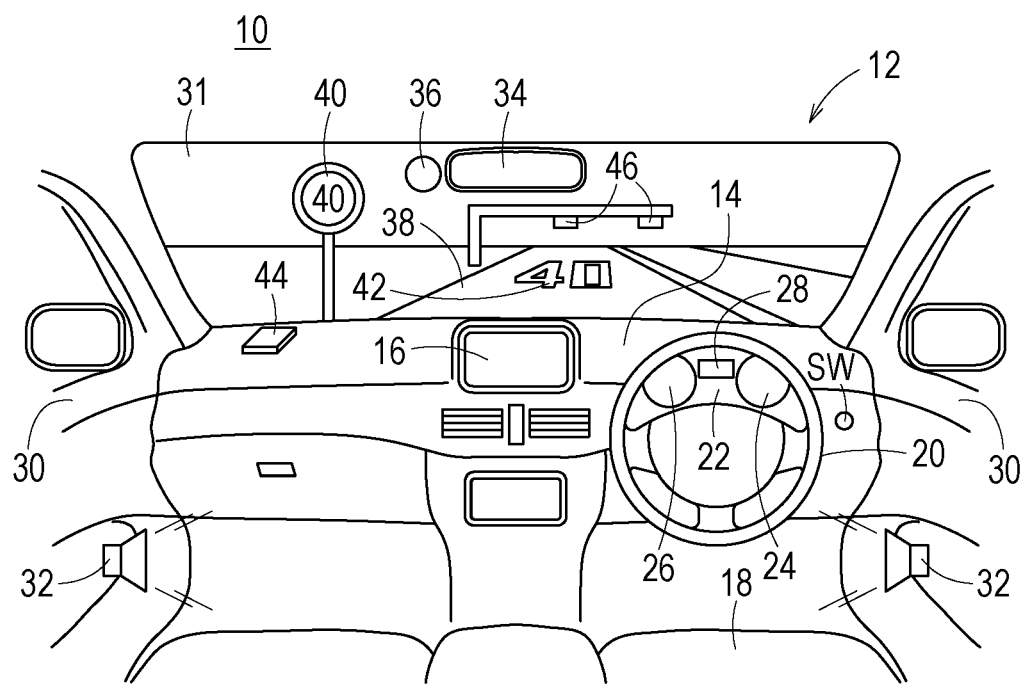
FIG. 1 is a schematic view of a simplified interior of a vehicle.

An interior of a vehicle 10 is described with reference to FIG. 1. The interior of the vehicle 10 shown in FIG. 1 is not illustrated to scale for ease of description. In a vehicle compartment 12 of the vehicle 10, a vehicle navigation device 16 is provided on a substantially center portion in the vehicle-width direction of a dashboard 14. An instrument panel 22 is provided on the right side in the vehicle-width direction of the dashboard 14 in front of a driver seat 18 and a steering wheel 20. The instrument panel 22 has a speedometer 24 located on the right side, a tachometer 26 located on the left side, and a multi-information display (MID) 28 located at the center, for example. The MID 28 is a display unit that displays an image indicating various types of information such as regulatory information and vehicle information (such as vehicle speed, yaw rate, fuel consumption, driving time, various traveled distances, drivable range, and drive mode). Content displayed on the MID 28 can be switched according to an operation of a switch SW provided in the vehicle compartment 12. Alternatively, a display of the vehicle navigation device 16, a head-up display (HUD), or a display of an information terminal may be used as the display unit. A speaker 32 is provided at each of the lower portions of the left and right front doors 30, near the respective kick panels. The speaker 32 outputs a voice indicating various types of information.

A camera 36 is provided on an inner side of a windshield 31, near a rearview mirror 34. The camera 36 is installed to face forward the front of the vehicle 10. Various types of cameras (such as a monocular camera, a stereo camera, and an infrared camera) are usable as the camera 36. The camera 36 captures images of ahead of the vehicle 10, which may include a road sign 40 and/or a road marking 42 indicating the regulatory information, constantly or at predetermined intervals. The camera 36 corresponds to an image capturing and detecting unit of a regulatory information detecting unit.

A radio receiver 44 for road-to-vehicle communication is provided on the left side of the dashboard 14 in the vehicle-width direction. The radio receiver 44 may be incorporated in the vehicle navigation device 16. The radio receiver 44 receives a signal transmitted from outside the vehicle 10. When a roadway 38 is a highway (including an expressway), multiple radio transmitters 46, such as optical beacons optically transmitting the regulatory information and electric beacons transmitting the regulatory information by using electric waves, are placed along the roadway 38. The radio transmitters 46 are managed by an information managing unit (not illustrated), and the information managing unit and the radio transmitters 46 constitute a regulatory information providing system. A vehicle information and communication system (VICS)® is an example of such a system. When the radio transmitter 46 is an optical beacon, the signal receiving area is an area covering several meters ahead of and behind a position just below the beacon. When the radio transmitter 46 is the electric beacon, the signal receiving area is an area covering several tens of meters ahead of and behind the position just below the beacon. The radio receiver 44 receives a signal of the regulatory information transmitted from the radio transmitter 46 in the receiving area. The radio receiver 44 corresponds to a communication detecting unit of the regulatory information detecting unit.

[2. Configuration of Regulatory Information Notifying Device 48]

Figure 2:
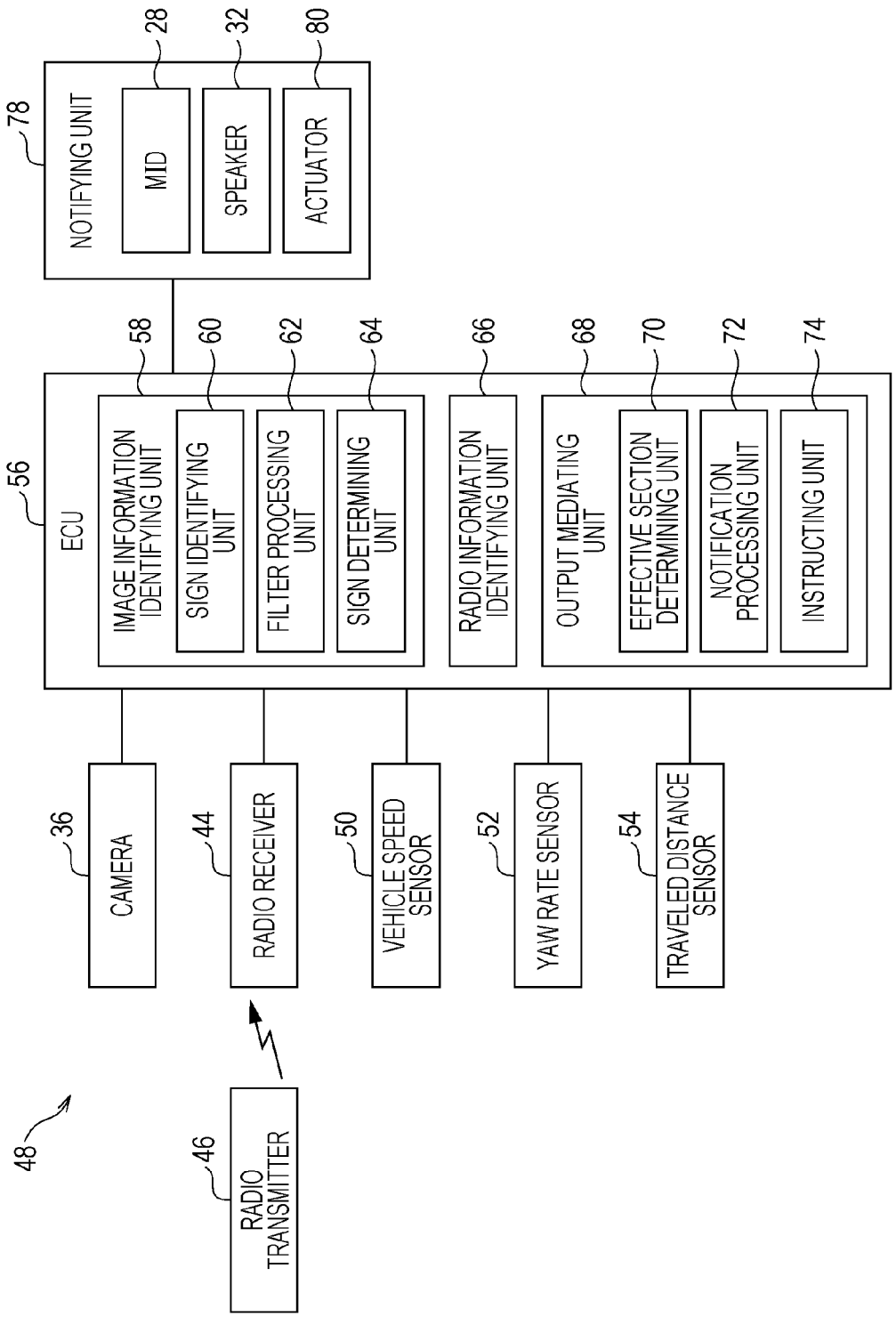
FIG. 2 is a block diagram of a regulatory information notifying device according to a present embodiment.

A configuration of a regulatory information notifying device 48 according to the present embodiment is described with reference to FIG. 2. The regulatory information notifying device 48 has information detecting units (36, 44, 50, 52, and 54), an ECU 56 that controls notification of the regulatory information based on information output by the information detecting units (36, 44, 50, 52, and 54), and a notifying unit 78 that notifies an occupant of the regulatory information according to instructions output by the ECU 56. The information detecting units (36, 44, 50, 52, and 54), the ECU 56, and the notifying unit 78 constitute part of an in-vehicle network and are capable of communicating with each other via the network.

The camera 36 and the radio receiver 44, also shown in FIG. 1, detect the regulatory information and output a signal including the detected regulatory information to the ECU 56. A vehicle speed sensor 50 detects the traveling speed of the vehicle 10. A yaw rate sensor 52 detects the yaw rate of the vehicle 10. A traveled distance sensor 54 detects the traveled distance of the vehicle 10.

The ECU 56 is a control circuit that controls the notifying unit 78 based on the regulatory information. The ECU 56 is a calculator including a microcomputer and has a central processing unit (CPU), a ROM (including an EEPROM), a random access memory (RAM), and input-output devices such as an AD converter and a DA converter, and the like. As the CPU reads out and executes a program stored in the ROM, the ECU 56 functions as a unit for implementing various functions. In the present embodiment, the ECU 56 functions as an image information identifying unit 58, a radio information identifying unit 66, and an output mediating unit 68 by executing the program. The ECU 56 may be divided into multiple parts or may be integrated with another ECU. Incidentally, these functions may be implemented by hardware.

The image information identifying unit 58 is configured to process the image of ahead of the vehicle 10 captured by the camera 36 and to identify the regulatory information indicated by the road sign 40 and the road marking 42. The image information identifying unit 58 is capable of executing processing for identifying publicly known road signs, such as pattern matching. The image information identifying unit 58 includes a sign identifying unit 60, a filter processing unit 62, and a sign determining unit 64. The sign identifying unit 60 is configured to identify an image of a sign (the road sign 40 and the road marking 42) from the image of ahead of the vehicle 10 captured by the camera 36. The filter processing unit 62 is configured to remove noise from the image (image of the road sign 40 and the road marking 42) identified by the sign identifying unit 60. The sign determining unit 64 is configured to identify a type of the regulatory information indicated by the image (image of the road sign 40 and the road marking 42) from which noise is removed by the filter processing unit 62.

The radio information identifying unit 66 is configured to identify the regulatory information in the signal received by the radio receiver 44. The radio transmitter 46 transmits various types of traffic information. Out of the regulatory information, the radio information identifying unit 66 identifies predetermined information such as speed limit information indicating a speed limit of the roadway 38, effective section information indicating a section in which the speed limit information is effective, and traffic light information indicating signal states of traffic lights 104a and 104b (see FIG. 10) placed after the radio transmitter 46. The effective section of the speed limit information is indicated as a distance started from where the radio transmitter 46 is.

The output mediating unit 68 is configured to mediate the regulatory information that should be notified by the notifying unit 78 out of the regulatory information identified by the image information identifying unit 58 and the radio information identifying unit 66. The output mediating unit 68 includes an effective section determining unit 70, a notification processing unit 72, and an instructing unit 74.

The effective section determining unit 70 is configured to determine whether or not the vehicle 10 is traveling in the effective section of the regulatory information detected by the image information identifying unit 58 and the radio information identifying unit 66. For example, the road sign 40 placed at the roadway 38 (see FIG. 1) is provided with an auxiliary sign indicating the effective section of the road sign 40. Based on the information of the auxiliary sign identified by the image information identifying unit 58, the effective section determining unit 70 determines whether or not the vehicle 10 is traveling in the effective section of the regulatory information indicated by the road sign 40. As for the road sign 40 provided with no auxiliary sign, the effective section determining unit 70 determines whether or not the vehicle 10 is traveling in the effective section of the regulatory information based on a constant distance started from where the road sign 40 is and the traveled distance detected by the traveled distance sensor 54. In addition, the effective section determining unit 70 determines whether or not the vehicle 10 is traveling in the effective section of the regulatory information based on the effective section information identified by the radio information identifying unit 66 and the traveled distance detected by the traveled distance sensor 54.

The notification processing unit 72 is configured to execute processing of controlling the notifying unit 78. The notification processing unit 72 determines which information should be notified, the regulatory information identified by the image information identifying unit 58 or the regulatory information identified by the radio information identifying unit 66 should be notified. When both pieces of regulatory information include the speed limit information, the notification processing unit 72 determines to notify the occupant of the speed limit information identified by the radio information identifying unit 66 with priority. The instructing unit 74 is configured to output notification instructions to the notifying unit 78 to respond to a determination result of the notification processing unit 72.

The notifying unit 78 includes various types of an actuator 80 in addition to the MID 28 and the speaker 32 shown in FIG. 1. The actuator 80 is, for example, an electric motor that drives parts such as a steering shaft, an accelerator pedal, and a seat belt.

[3. Regulatory Information Notifying Processing]

Three representative processing examples (first to third processing) executed by the regulatory information notifying device 48 are described.

[3-1. First Processing]

A first processing is to notify the occupant of the speed limit information (regulatory information) detected by the road-to-vehicle communication with priority to the speed limit information (regulatory information) detected by image capturing. A procedure of the first processing is described below with reference to FIG. 3. The sequential processing described below may be executed periodically or at a predetermined timing, for example, a timing when the regulatory information is detected by the camera 36 and/or the radio receiver 44. In addition, the sequential processing may be executed at a timing when the vehicle 10 is out of the effective section of the regulatory information detected by either the camera 36 or the radio receiver 44.

In step S1, the regulatory information is detected by the road-to-vehicle communication. When the vehicle 10 is in the receiving area of the signal transmitted from the radio transmitter 46, the radio receiver 44 receives the signal transmitted from the radio transmitter 46. The radio information identifying unit 66 identifies the regulatory information in the signal received by the radio receiver 44. Then, the effective section determining unit 70 starts to measure the traveled distance of the vehicle 10 started from where the radio transmitter 46 is. On the other hand, when the vehicle 10 is out of the receiving area of the signal transmitted from the radio transmitter 46, the radio receiver 44 receives no signal transmitted from the radio transmitter 46.

Processing in step S2 is executed concurrently with the processing in step S1. In step S2, the regulatory information is detected by image capturing. The camera 36 captures the image of ahead of the vehicle 10. The image captured by the camera 36 is imported to the image information identifying unit 58. The sign identifying unit 60, filter processing unit 62, and the sign determining unit 64 of the image information identifying unit 58 execute sequential sign identification processing and identify the regulatory information indicated by the road sign 40 and the road marking 42 included in the image of ahead of the vehicle 10. When the road sign 40 has no auxiliary sign indicating the effective section of the regulatory information, the effective section determining unit 70 starts to measure the traveled distance of the vehicle 10 started from where the road sign 40 and the road marking 42 are. When no road sign 40 or road marking 42 is in front of the vehicle 10, the camera 36 detects no regulatory information.

In step S3, whether or not the speed limit information is detected by the road-to-vehicle communication is determined. When no speed limit information is detected by the road-to-vehicle communication (step S3: NO), the processing proceeds to step S5. Even when the speed limit information is detected by the road-to-vehicle communication, the speed limit information is deemed to be not detected (step S3: NO) in a case where the vehicle 10 is already traveling out of the effective section of the speed limit information. Thereby, the processing proceeds to step S5. The effective section determining unit 70 determines whether or not the vehicle 10 is traveling in the effective section of the speed limit information.

The effective section determining unit 70 compares the effective section of the latest regulatory information detected by the radio receiver 44 and the traveled distance of the vehicle 10 started from where the radio transmitter 46 is. When the traveled distance is within the effective section, the effective section determining unit 70 determines that the vehicle 10 is traveling in the effective section of the latest regulatory information detected by the radio receiver 44. In this case, the speed limit information is determined to be detected by the road-to-vehicle communication (step S3: YES), and thereby the processing proceeds to step S4. On the other hand, when the traveled distance is out of the effective section, the effective section determining unit 70 determines that the vehicle 10 is traveling out of the effective section of the latest regulatory information detected by the radio receiver 44. In this case, no speed limit information is determined to be detected by the road-to-vehicle communication (step S3: NO), and thereby the processing proceeds to step S5.

In step S4, the speed limit information detected by the road-to-vehicle communication is notified. Regardless of whether or not the speed limit information is detected by the camera 36, the notification processing unit 72 determines to notify the occupant of the speed limit information detected by the radio receiver 44 with priority. Responding to the determination result of the notification processing unit 72, the instructing unit 74 outputs the notification instructions to the notifying unit 78. In accordance with the notification instructions output by the instructing unit 74, the MID 28 of the notifying unit 78 displays the speed limit information detected by the radio receiver 44. In other words, the MID 28 displays a sign image indicating the speed limit information on the screen. The speaker 32 outputs the same information with the voice.

In step S5, whether or not the speed limit information is detected by image capturing is determined. When no speed limit information is detected by image capturing (step S5: NO), the processing proceeds to step S7. Even when the speed limit information is detected by image capturing, the speed limit information is deemed to be not detected (step S5: NO) in a case where the vehicle 10 is already traveling out of the effective section of the speed limit information. Thereby, the processing proceeds to step S7. The effective section determining unit 70 determines whether or not the vehicle 10 is traveling in the effective section of the speed limit information.

Based on information of the latest auxiliary sign detected by the camera 36, the effective section determining unit 70 determines whether or not the vehicle 10 is traveling in the effective section of the regulatory information indicated by the road sign 40. When the latest auxiliary sign indicates "start" or "within the section", the effective section determining unit 70 determines that the vehicle 10 is traveling in the effective section of the latest regulatory information detected by the camera 36. When no information of the auxiliary sign is detected, the effective section determining unit 70 compares the predetermined effective section and the traveled distance of the vehicle 10 started from where the road sign 40 and the road marking 42 are. When the traveled distance is within the effective section, the effective section determining unit 70 determines that the vehicle 10 is traveling in the effective section of the latest regulatory information detected by the camera 36. In this case, the speed limit information is determined to be detected by image capturing (step S5: YES), and thereby the processing proceeds to step S6. On the other hand, when the latest auxiliary sign indicates "end" or when the traveled distance is out of the effective section, the effective section determining unit 70 determines that the vehicle 10 is traveling out of the effective section of the latest regulatory information detected by the camera 36. In this case, no speed limit information is determined to be detected by image capturing (step S5: NO), and thereby the processing proceeds to step S7.

In step S6, the speed limit information detected by image capturing is notified. The notification processing unit 72 determines to notify the occupant of the speed limit information detected by the camera 36. Responding to the determination result of the notification processing unit 72, the instructing unit 74 outputs the notification instructions to the notifying unit 78. In accordance with the notification instructions output by the instructing unit 74, the MID 28 displays the speed limit information detected by the camera 36. In other words, the MID 28 displays the sign image indicating the speed limit information on the screen. The speaker 32 outputs the same information with the voice.

In step S7, whether or not other regulatory information is detected by image capturing is determined. When the other regulatory information other than the speed limit information is not detected by image capturing (step S7: NO), the sequential processing is once terminated. Even when the other regulatory information is detected by image capturing, the other regulatory information is deemed to be not detected (step S7: NO) in a case where the vehicle 10 is already traveling out of the effective section of the other regulatory information. Thereby, the sequential processing is once terminated. As with the processing in step S5, the effective section determining unit 70 determines whether or not the vehicle 10 is traveling in the effective section of the other regulatory information.

When the effective section determining unit 70 determines that the other regulatory information is detected by image capturing (step S7: YES), the processing proceeds to step S8. When the effective section determining unit 70 determines that the other regulatory information is not detected by image capturing (step S7: NO), the sequential processing is once terminated.

In step S8, the other regulatory information detected by image capturing is notified. The notification processing unit 72 determines to notify the occupant of the other regulatory information detected by the camera 36. Responding to the determination result of the notification processing unit 72, the instructing unit 74 outputs the notification instructions to the notifying unit 78. In accordance with the notification instructions output by the instructing unit 74, the MID 28 displays the other regulatory information detected by the camera 36. When the speed limit information is detected by the radio receiver 44, the MID 28 concurrently displays the speed limit information detected by the radio receiver 44 and the other regulatory information detected by the camera 36. When the speed limit information is detected by the camera 36 but not by the radio receiver 44, the MID 28 displays the speed limit information and the other regulatory information both detected by the camera 36. In other words, the MID 28 displays the sign image indicating the speed limit information and a sign image indicating the other regulatory information on the screen.

When the processing in steps S1 to S8 terminates, the processing returns to step S1 and the sequential processing is repeated.

[3-1-1. Specific Example 1]

A specific example 1 of the first processing is described with reference to FIG. 4, and FIGS. 2 and 3 when necessary. The specific example 1 uses the MID 28 as the notifying unit 78. As shown in FIG. 4, road signs 40a to 40c respectively indicating speed limits and the radio transmitter 46 are placed at the roadway 38. The road sign 40a, which indicates the speed limit of 50 km/h, is placed near a start point of a section SE11. The road sign 40b, which indicates the speed limit of 40 km/h, is placed near a start point of a section SE12. The road sign 40c, which indicates the speed limit of 50 km/h, is placed near an end point of the section SE12. The radio transmitter 46 is placed at the start point of the section SE12. The section SE12 is a support section of the road-to-vehicle communication, that is, the effective section of the speed limit information transmitted from the radio transmitter 46.

When the vehicle 10 travels before the start point of the section SE11 of the roadway 38, the camera 36 captures an image including the road sign 40a. The image information identifying unit 58 then identifies the speed limit information, which is 50 km/h, indicated by the road sign 40*a* (step S2). At this moment, no speed limit information is detected by the road-to-vehicle communication (step S3: NO). Thus, the notification processing unit 72 determines to display the speed limit information, 50 km/h, detected by the image information identifying unit 58 (step S5: YES). Responding to the determination result of the notification processing unit 72, the instructing unit 74 outputs the notification instructions to the MID 28. In accordance with the notification instructions, the MID 28 displays an image 90*a* of the speed limit information, 50 km/h, as shown in FIG. 4 (step S6).

When the vehicle 10 reaches the start point of the section SE12 of the roadway 38, the radio receiver 44 receives the signal transmitted from the radio transmitter 46. The radio information identifying unit 66 then identifies the speed limit information, which is 40 km/h, transmitted from the radio transmitter 46 (step S1). At this moment, the speed limit information, 50 km/h, is already detected by the camera 36 at the section SE11. The notification processing unit 72 determines to display the speed limit information, 40 km/h, detected by the radio receiver 44 with priority to the speed limit information, 50 km/h, detected by the camera 36 (step S3: YES). Responding to the determination result of the notification processing unit 72, the instructing unit 74 outputs the notification instructions to the MID 28. In accordance with the notification instructions, the MID 28 displays an image 90*b* of the speed limit information, 40 km/h, as shown in FIG. 4 (step S4).

When the vehicle 10 passes through the start point of the section SE12 of the roadway 38, the camera 36 captures an image including the road sign 40*b*. When the vehicle 10 travels near the end point of the section SE12 of the roadway 38, the camera 36 captures an image including the road sign 40*c*. However, the section SE12 is within the effective section of the speed limit information, 40 km/h, detected by the radio receiver 44. Thus, the notification processing unit 72 determines to display the speed limit information, 40 km/h, detected by the radio receiver 44 with priority to the speed limit information, 40 km/h and 50 km/h, detected by the camera 36 (step S3: YES). The MID 28 keeps displaying the image 90*b* of the speed limit information, 40 km/h (step S4).

When the vehicle 10 passes through the end point of the section SE12 of the roadway 38 and travels into a section SE13, the vehicle 10 is out of the effective section of the speed limit information, 40 km/h, detected by the radio receiver 44. At this moment, the speed limit information, which is 50 km/h, indicated by the road sign 40*c* is already detected by image capturing (step S3: NO). Thus, the notification processing unit 72 determines to display the speed limit information, 50 km/h, detected by the image information identifying unit 58 (step S5: YES). Responding to the determination result of the notification processing unit 72, the instructing unit 74 outputs the notification instructions to the MID 28. In accordance with the notification instructions, the MID 28 displays an image 90*c* of the speed limit information, 50 km/h, as shown in FIG. 4 (step S6).

[3-1-2. Specific Example 2]

Figure 5:
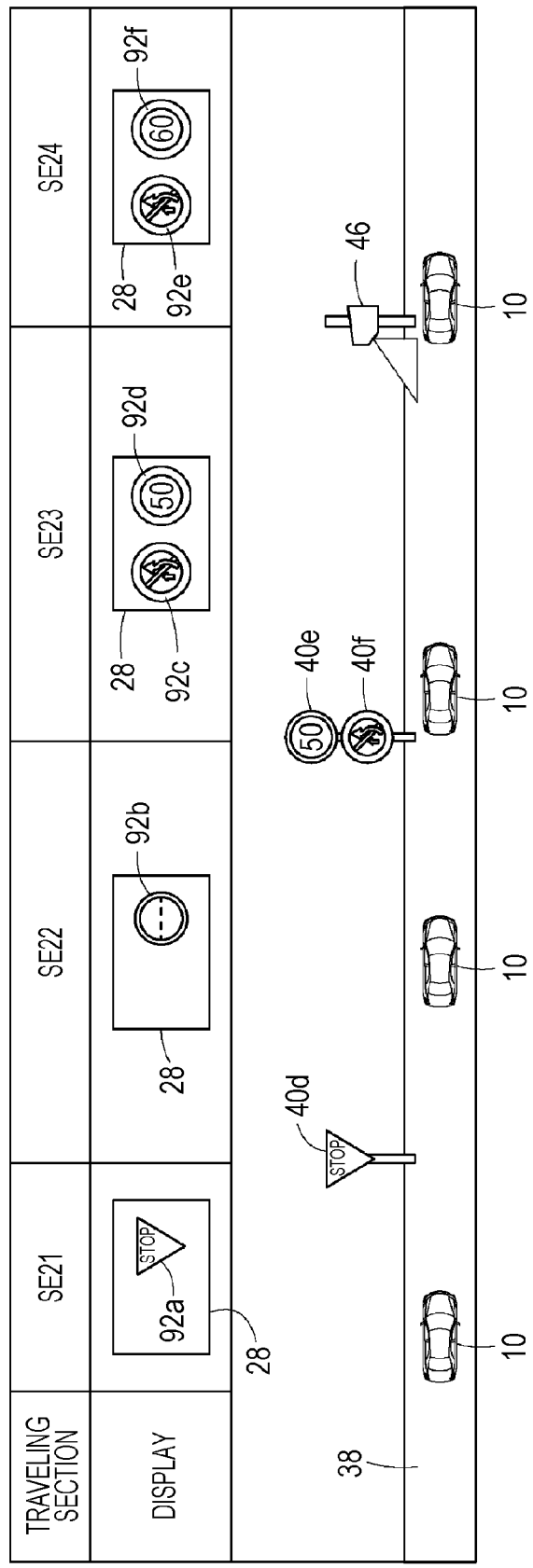
FIG. 5 is a diagram illustrating a state of a specific example 2.

A specific example 2 of the first processing is described with reference to FIG. 5, and FIGS. 2 and 3 when necessary. The specific example 2 uses the MID 28 as the notifying unit 78. As shown in FIG. 5, a road sign 40*d* indicating other regulatory information (stop), a road sign 40*e* indicating the speed limit, a road sign 40*f* indicating other regulatory information (no overtaking), and the radio transmitter 46 are placed on the roadway 38. The road sign 40*d*, which indicates stop, is placed near an end point of a section SE21.

The road sign 40*e*, which indicates the speed limit of 50 km/h, and the road sign 40*f*, which indicates no overtaking, are placed near a start point of a section SE23. The radio transmitter 46 is placed at a start point of a section SE24. The section SE24 is the support section of the road-to-vehicle communication, that is, the effective section of the speed limit information transmitted from the radio transmitter 46.

When the vehicle 10 travels before the end point of the section SE21 of the roadway 38, the camera 36 captures an image including the road sign 40*d*. The image information identifying unit 58 then identifies the other regulatory information, which is stop, indicated by the road sign 40*d* (step S2). At this moment, no speed limit information is detected by the road-to-vehicle communication and image capturing (step S3: NO, step S5: NO). The notification processing unit 72 determines to display the other regulatory information, stop, detected by the camera 36 (step S7: YES). In this case, the other regulatory information, stop, should be notified to the occupant before the vehicle 10 reaches a position where the vehicle 10 has to stop. Thus, the instructing unit 74 outputs the notification instructions to the MID 28 at a timing when the vehicle 10 travels before the road sign 40*d*. In accordance with the notification instructions, the MID 28 displays an image 92*a* of the other regulatory information, stop, as shown in FIG. 5 (step S8).

A section SE22 of the roadway 38 is out of the effective section of the regulatory information detected from the radio transmitter 46 and the regulatory information indicated by the road signs 40*d* to 40*f*. No speed limit information is detected by the road-to-vehicle communication and image capturing (step S3: NO, step S5: NO). Further, the section SE22 is out of the effective section of the other regulatory information, stop, detected at the section SE21 (step S7: NO). The instructing unit 74 outputs the notification instructions to the MID 28. In accordance with the notification instructions of the instructing unit 74, the MID 28 displays an image 92*b* indicating no detection of the regulatory information as shown in FIG. 5 (step S8).

When the vehicle 10 travels before the start point of the section SE23 of the roadway 38, the camera 36 captures an image including the road signs 40*e* and 40*f*. The image information identifying unit 58 then identifies the speed limit information, which is 50 km/h, indicated by the road sign 40*e* and the other regulatory information, which is no overtaking, indicated by the road sign 40*f* (step S2). At this moment, no speed limit information is detected by the road-to-vehicle communication (step S3: NO). Thus, the notification processing unit 72 determines to display the speed limit information, 50 km/h, and the other regulatory information, no overtaking, detected by the camera 36 (step S5: YES, step S7: YES). The instructing unit 74 outputs the notification instructions to the MID 28 at a timing when the vehicle 10 passes through the road signs 40*e* and 40*f*. In accordance with the notification instructions, the MID 28 displays an image 92*d* of the speed limit information, 50 km/h, and an image 92*c* of the other regulatory information, no overtaking, next to each other as shown in FIG. 5 (steps S6 and S8).

When the vehicle 10 reaches the start point of the section SE24 of the roadway 38, the radio receiver 44 receives the signal transmitted from the radio transmitter 46. The radio information identifying unit 66 then identifies the speed limit information, which is 60 km/h, transmitted from the radio transmitter 46 (step S1). At this moment, the speed limit information, 50 km/h, is already detected by the camera 36 at the section SE23. The notification processing unit 72 determines to display the speed limit information, 60 km/h, detected by the radio receiver 44 with priority to the speed limit information, 50 km/h, detected by the camera 36 (step S3: YES). Further, when the start point of the section SE24 is within the effective section of the other regulatory information, no overtaking, detected by the camera 36, the notification processing unit 72 determines to display the other regulatory information (step S7: YES). Responding to the determination result of the notification processing unit 72, the instructing unit 74 outputs the notification instructions to the MID 28. In accordance with the notification instructions, the MID 28 displays an image 92f of the speed limit information, 60 km/h, and an image 92e of the other regulatory information, no overtaking, next to each other as shown in FIG. 5 (steps S4 and S8).

[3-2. Second Processing]

The regulatory information notifying device 48 is capable of executing later-described second processing instead of the above-described first processing.

The second processing is to notify the occupant of the speed limit information (regulatory information) detected by the road-to-vehicle communication with priority to the speed limit information (regulatory information) detected by image capturing. Further, the second processing is to notify the occupant of the information of stop detected by image capturing with priority to the speed limit information detected by image capturing. Hereinafter, a procedure of the second processing is described with reference to FIG. 6. Sequential processing described below may be executed periodically or at a predetermined timing such as the timing when the regulatory information is detected by the camera 36 and/or the radio receiver 44. In addition, the sequential processing may be executed at the timing when the vehicle 10 is out of the effective section of the regulatory information detected by either the camera 36 or the radio receiver 44.

Figure 3:
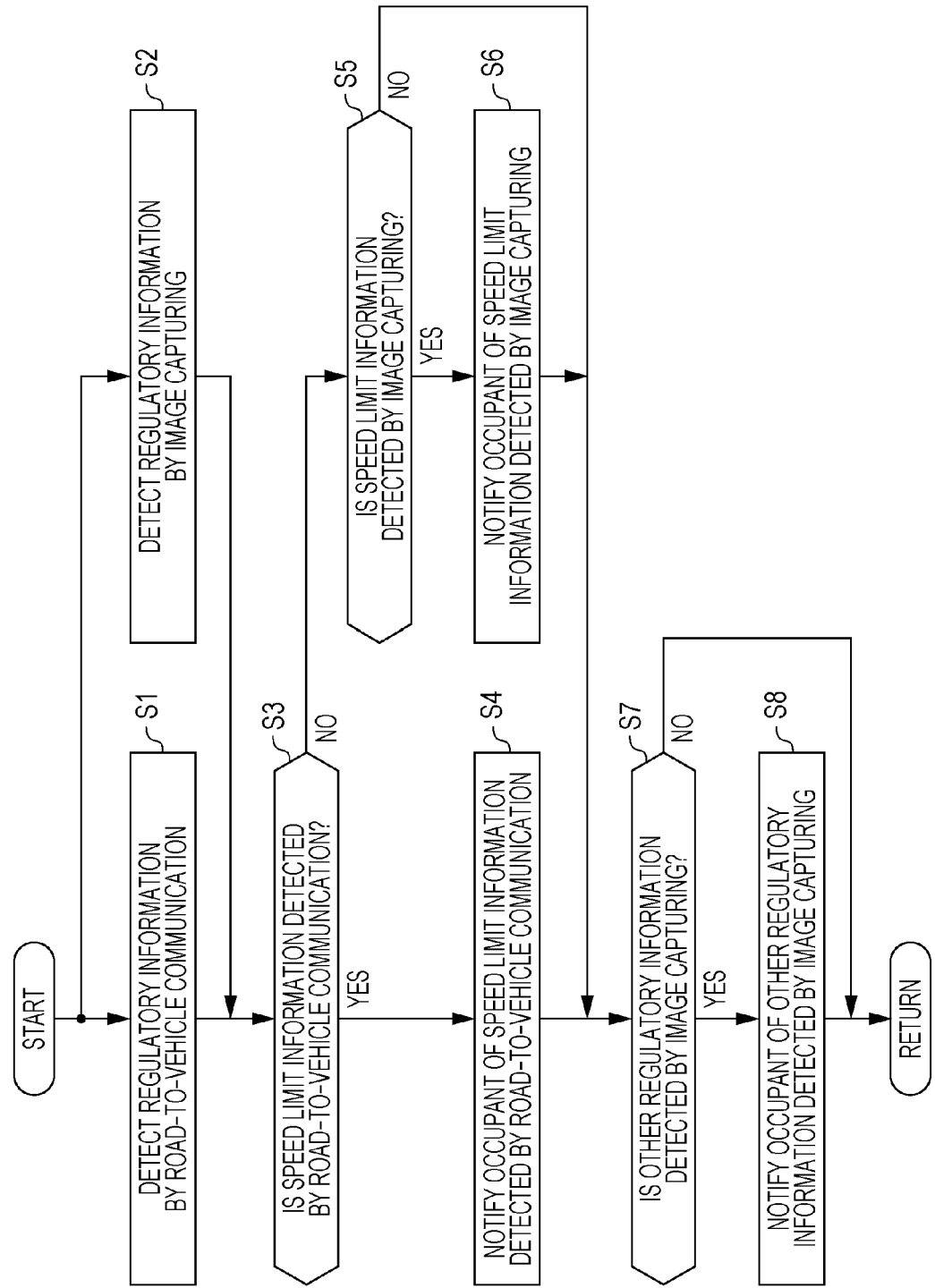
FIG. 3 is a flowchart of a regulatory information notification processing according to a first processing.
Figure 4:
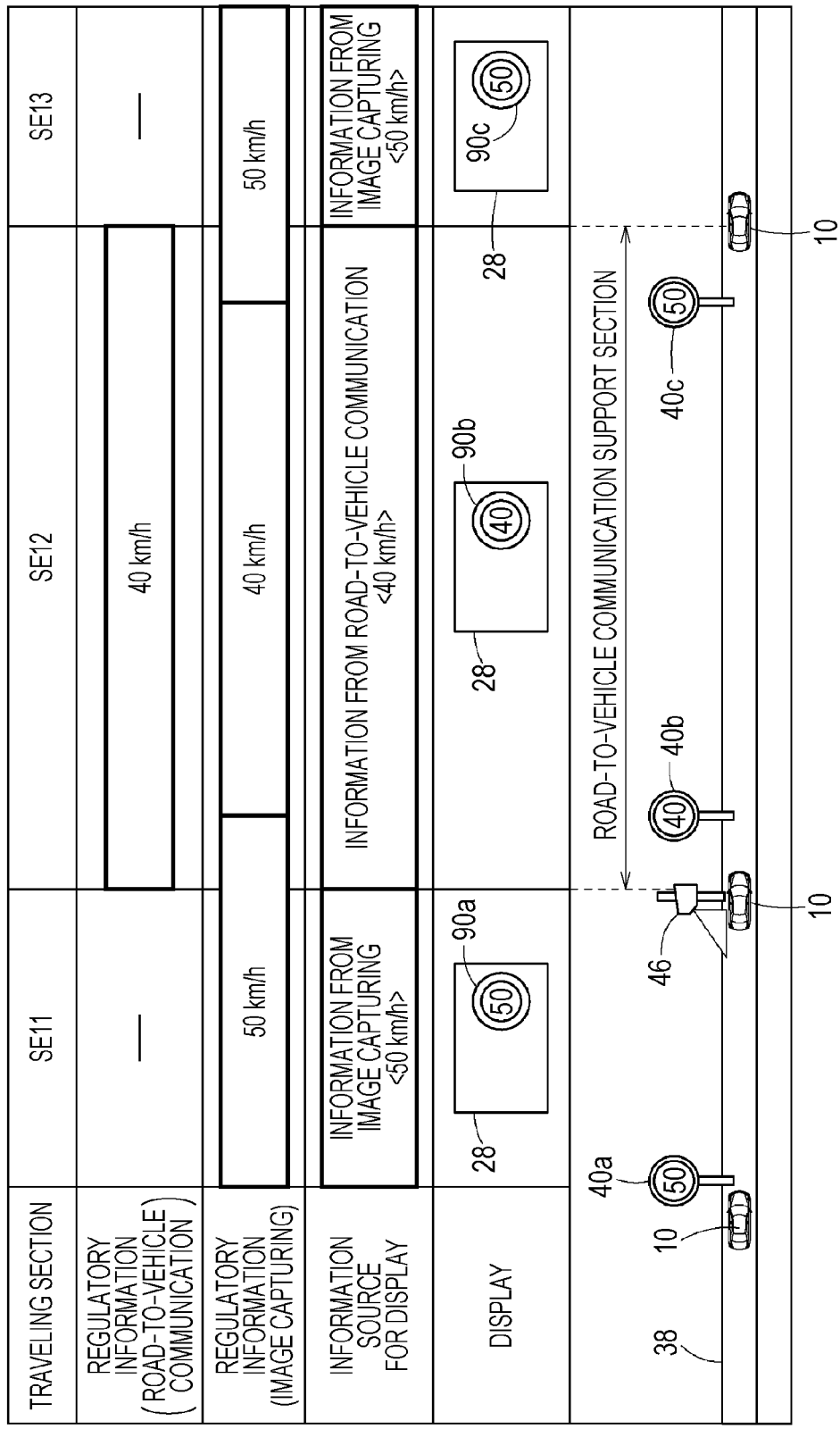
FIG. 4 is a diagram illustrating a state of a specific example 1.
Figure 6:
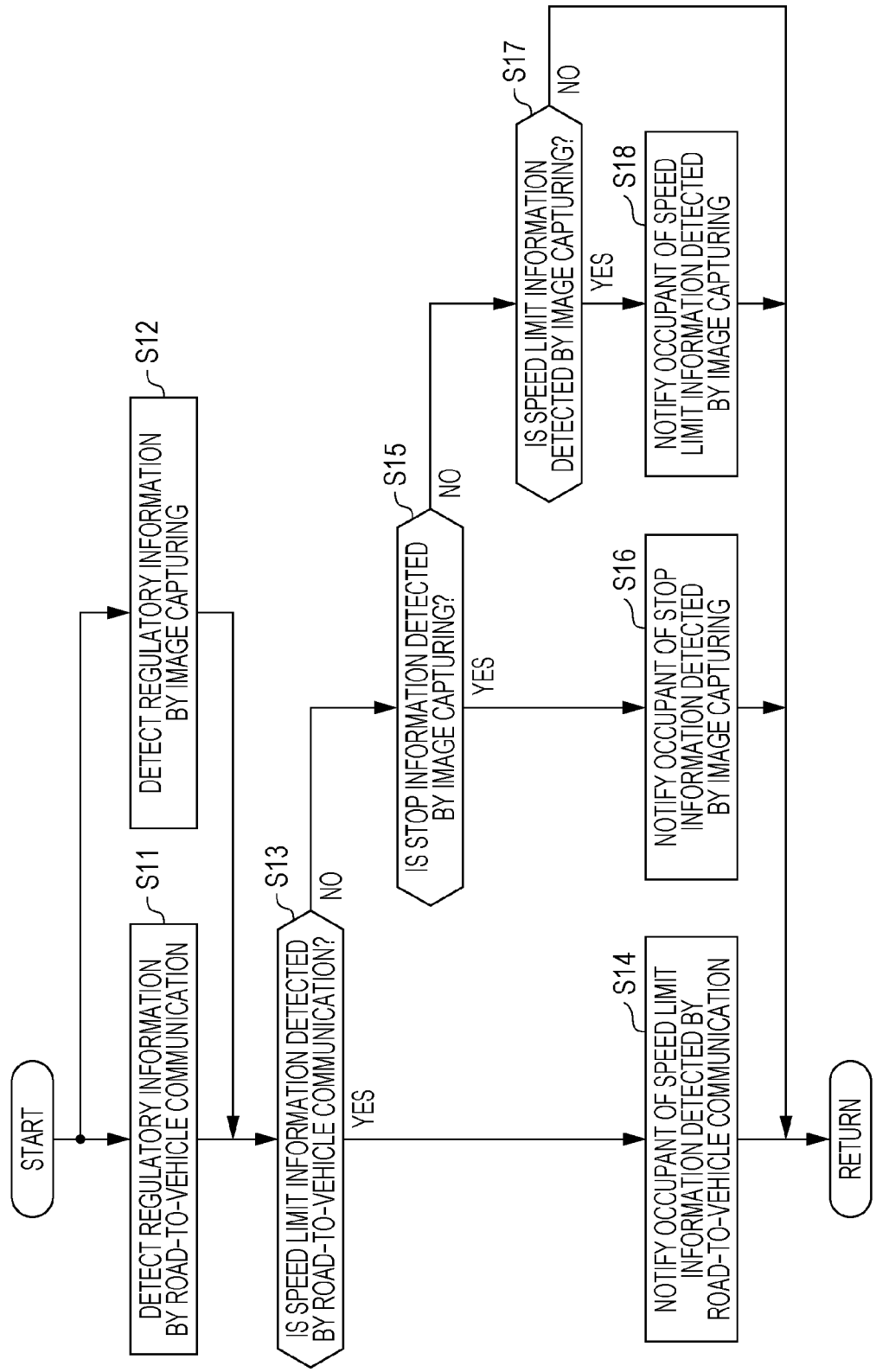
FIG. 6 is a flowchart of a regulatory information notification processing according to a second processing.

In the sequential processing shown in FIG. 6, the processing in steps S11 to S14, S17, and S18 is the same as the processing in steps S1 to S6 of the first processing shown in FIG. 3. Thus, detailed description of the processing that is the same as the first processing is omitted. As for a feature of the second processing, processing in step S15 is executed at a timing between the processing in steps S13 and S17.

The regulatory information is detected in each of steps S11 and S12, and whether or not the speed limit information is detected by the road-to-vehicle communication is determined in step S13. When the speed limit information is detected by the road-to-vehicle communication (step S13: YES), the processing proceeds to step S14. In step S14, the MID 28 displays the sign image indicating the speed limit information on the screen. The speaker 32 outputs the same information with the voice. On the other hand, when no speed limit information is detected by the road-to-vehicle communication (step S13: NO), the processing proceeds to step S15.

In step S15, whether or not the other regulatory information indicating stop is detected by image capturing is determined. When the other regulatory information indicating stop is detected by image capturing (step S15: YES), the processing proceeds to step S16. On the other hand, when the other regulatory information indicating stop is detected by image capturing (step S15: NO), the processing proceeds to step S17.

In step S16, the information of stop detected by image capturing is notified. The notification processing unit 72 determines to notify the occupant of the information of stop detected by the camera 36. Responding to the determination result of the notification processing unit 72, the instructing unit 74 outputs the notification instructions to the notifying unit 78. In accordance with the notification instructions output by the instructing unit 74, the MID 28 displays the information of stop detected by the camera 36. In other words, the MID 28 displays the sign image indicating the information of stop on the screen. The speaker 32 outputs the same information with the voice. The actuator 80 provided to the parts such as the steering shaft, accelerator pedal, and the seat belt oscillates.

In step S17, whether or not the speed limit information is detected by image capturing is determined. When the speed limit information is detected by image capturing (step S17: YES), the processing proceeds to step S18. In step S18, the MID 28 displays the sign image indicating the speed limit information on the screen. The speaker 32 outputs the same information with the voice. On the other hand, when no speed limit information is detected by image capturing (step S17: NO), the sequential processing is once terminated.

When the processing in steps S11 to S18 terminates, the processing returns to step S11 and the sequential processing is repeated.

[3-2-1. Specific Example 3]

Figure 7:
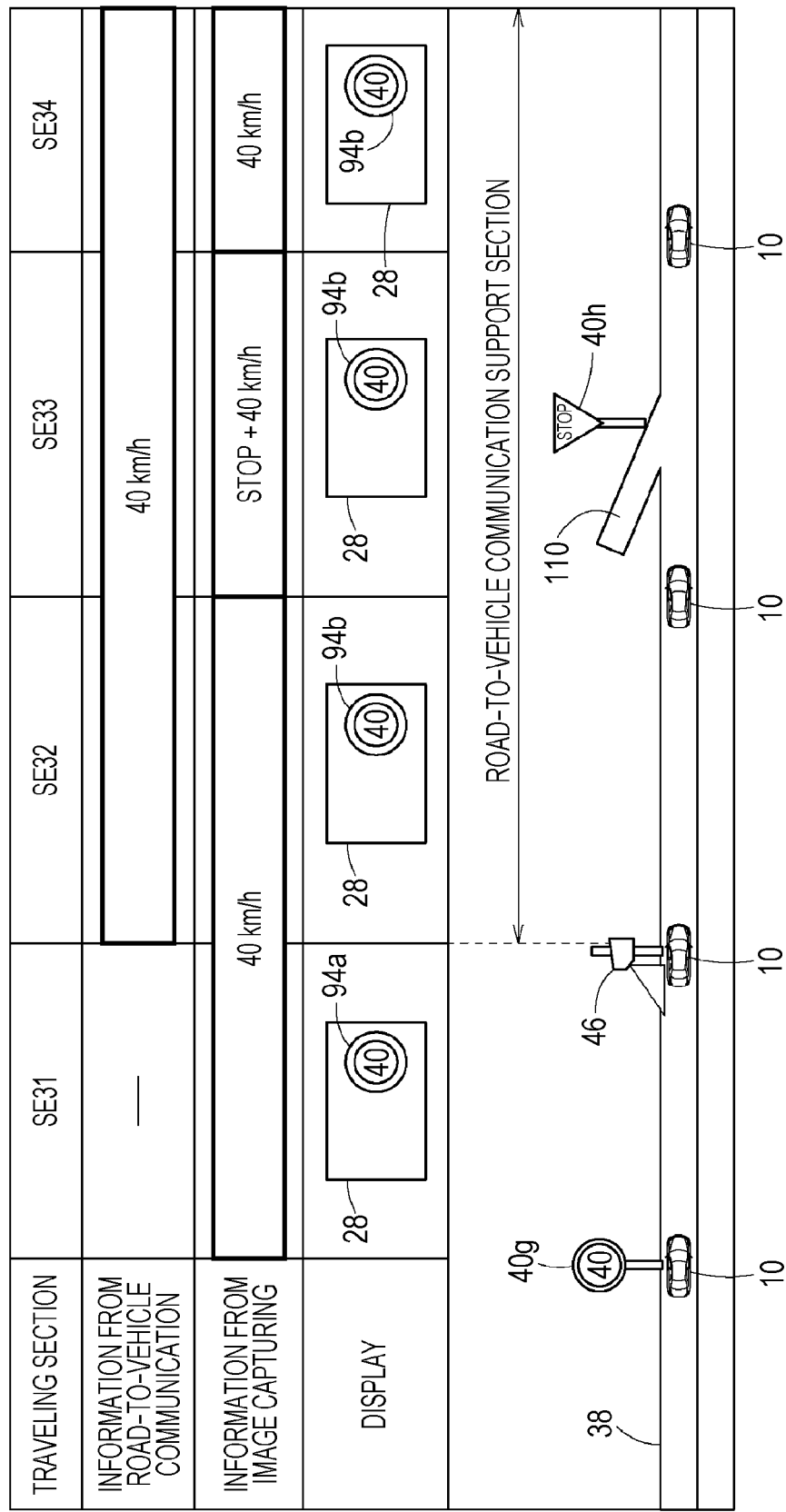
FIG. 7 is a diagram illustrating a state of a specific example 3.

A specific example 3 of the second processing is described with reference to FIG. 7, and FIGS. 2 and 6 when necessary. The specific example 3 uses the MID 28 as the notifying unit 78. As shown in FIG. 7, a road sign 40g indicating the speed limit and the radio transmitter 46 are placed at the roadway 38. The road sign 40g, which indicates the speed limit of 40 km/h, is placed near a start point of a section SE31. The radio transmitter 46 is placed at a start point of a section SE32. The sections SE32 to SE 34 are a support section of the road-to-vehicle communication, that is, the effective section of the speed limit information transmitted from the radio transmitter 46. A side road 110 merges with the roadway 38 at a position near an end point of the section SE33 of the roadway 38. A road sign 40h indicating stop is placed near the merging point of the side road 110 and the roadway 38. The road sign 40h is a sign for the side road 110 but not for the roadway 38.

When the vehicle 10 travels before the start point of the section SE31 of the roadway 38, the camera 36 captures an image including the road sign 40g. The image information identifying unit 58 then identifies the speed limit information, which is 40 km/h, indicated by the road sign 40g (step S12). At this moment, no speed limit information is detected by the road-to-vehicle communication (step S13: NO). Further, no information of stop is detected by image capturing (step S15: NO). Thus, the notification processing unit 72 determines to display the speed limit information, 40 km/h, detected by the camera 36 (step S17: YES). Responding to the determination result of the notification processing unit 72, the instructing unit 74 outputs the notification instructions to the MID 28. In accordance with the notification instructions, the MID 28 displays an image 94a of the speed limit information, 40 km/h, as shown in FIG. 7 (step S18).

When the vehicle 10 reaches the start point of the section SE32 of the roadway 38, the radio receiver 44 receives the signal transmitted from the radio transmitter 46. The radio information identifying unit 66 then identifies the speed limit information, which is 40 km/h, transmitted from the radio transmitter 46 (step S11). At this moment, the speed limit information, 40 km/h, is already detected by the camera 36 at the section SE31. The notification processing unit 72 determines to display the speed limit information, 40 km/h, detected by the radio receiver 44 with priority to the speed limit information, 40 km/h, detected by the camera 36

(step S13: YES). Responding to the determination result of the notification processing unit 72, the instructing unit 74 outputs the notification instructions to the MID 28. In accordance with the notification instructions, the MID 28 displays an image 94b of the speed limit information, 40 km/h, as shown in FIG. 7 (step S14).

When the vehicle 10 travels before the merging point of the side road 110 and the roadway 38 in the section SE33 of the roadway 38, the camera 36 captures an image including the road sign 40h. The road sign 40h is a sign indicating the regulatory information for the side road 110, not for the roadway 38. However, the road sign 40h in the image cannot be determined as to whether the road sign 40h indicates the regulatory information for the side road 110 or for the roadway 38. In the present application, the regulatory information detected by the road-to-vehicle communication is notified with priority to the regulatory information detected by image capturing. Thus, the regulatory information detected by image capturing within the support section of the road-to-vehicle communication is practically ignored. In addition, the radio transmitter 46 is usually placed at the highway. Moreover, the information of stop is not presented on the highway. Thus, even when the information of stop is detected by image capturing, the information is ignored. As a result, in accordance with the notification instructions, the MID 28 keeps displaying the image 94b of the speed limit information, 40 km/h, as shown in FIG. 7 (step S14).

The section SE34 of the roadway 38 is the support section of road-to-vehicle communication, that is, a section within the effective section of the speed limit information transmitted from the radio transmitter 46. Thus, in accordance with the notification instructions, the MID 28 keeps displaying the image 94b of the speed limit information, 40 km/h, as shown in FIG. 7 (step S14).

[3-2-2. Specific Example 4]

Figure 8:
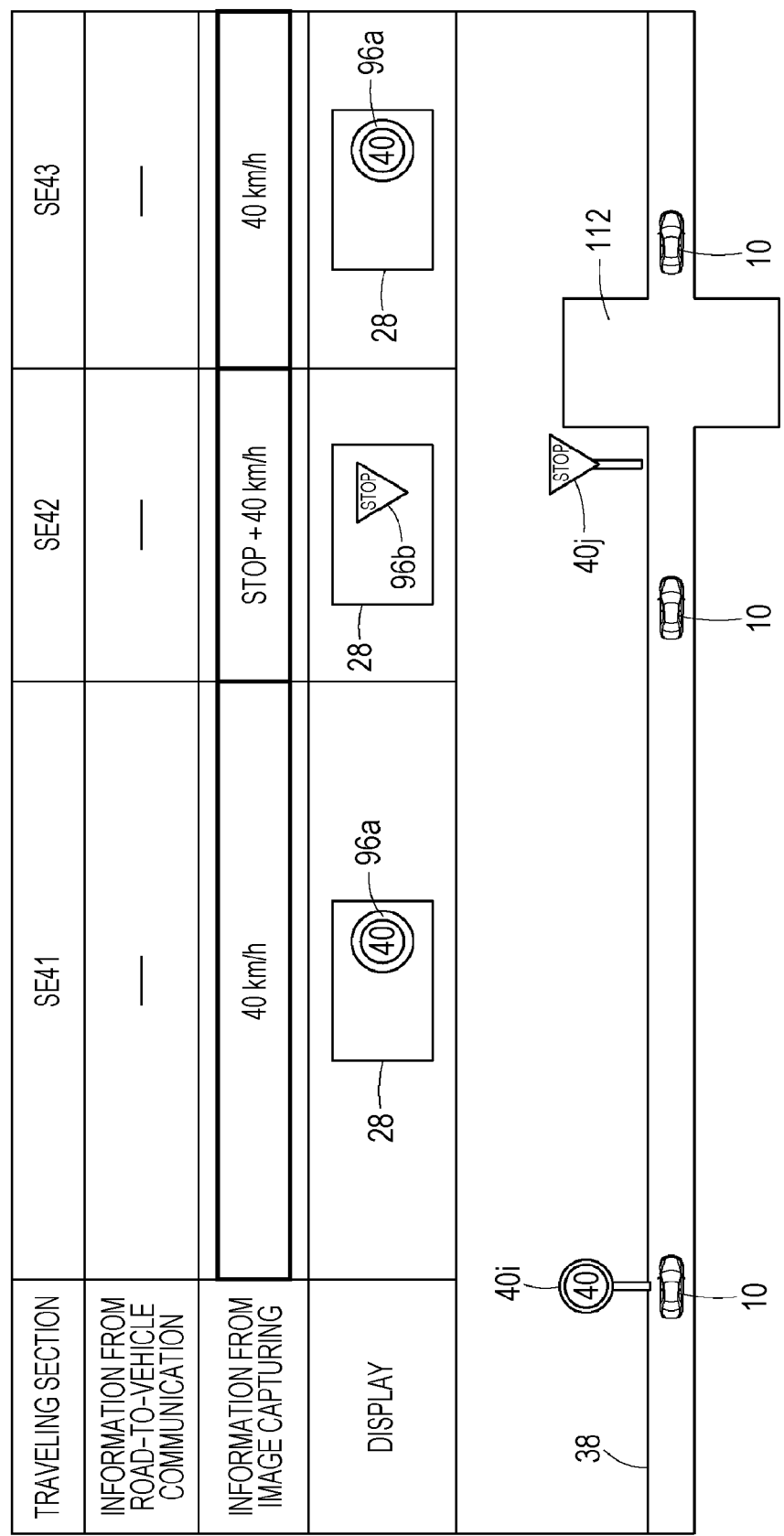
FIG. 8 is a diagram illustrating a state of a specific example 4.

A specific example 4 of the second processing is described with reference to FIG. 8, and FIGS. 2 and 6 when necessary. The specific example 4 uses the MID 28 as the notifying unit 78. As shown in FIG. 8, a road sign 40i indicating the speed limit and a road sign 40j indicating stop are placed at the roadway 38. The road sign 40i, which indicates the speed limit of 40 km/h, is placed near a start point of a section SE41. The road sign 40j, which indicates stop, is placed near an end point of a section SE42. Another roadway 112, which is with priority to the roadway 38, crosses the roadway 38 at the end point of the section SE42 and a start point of a section SE43.

When the vehicle 10 travels before the start point of the section SE41 of the roadway 38, the camera 36 captures an image including the road sign 40i. The image information identifying unit 58 then identifies the speed limit information, which is 40 km/h, indicated by the road sign 40i (step S12). At this moment, no speed limit information is detected by the road-to-vehicle communication (step S13: NO). Further, no information of stop is detected by image capturing (step S15: NO). Thus, the notification processing unit 72 determines to display the speed limit information, 40 km/h, detected by camera 36 (step S17: YES). Responding to the determination result of the notification processing unit 72, the instructing unit 74 outputs the notification instructions to the MID 28. In accordance with the notification instructions, the MID 28 displays an image 96a of the speed limit information, 40 km/h, as shown in FIG. 8 (step S18).

When the vehicle 10 travels before the end point of the section SE42 of the roadway 38, the camera 36 captures an image including the road sign 40j. The image information identifying unit 58 then identifies the other regulatory information, which is stop, indicated by the road sign 40j (step S12). At this moment, no speed limit information is detected by the road-to-vehicle communication (step S13: NO). However, at this moment, the speed limit information, 40 km/h, is already detected by the camera 36 at the section SE41. The notification processing unit 72 determines to display the other regulatory information, stop, with priority to the speed limit information, 40 km/h (step S15: YES). Responding to the determination result of the notification processing unit 72, the instructing unit 74 outputs the notification instructions to the MID 28. In accordance with the notification instructions, the MID 28 displays an image 96b of the other regulatory information, stop, as shown in FIG. 8 (step S16).

The section SE43 of the roadway 38 is the effective section of the speed limit information, 40 km/h, detected by the camera 36 at the section SE41. As a result, in accordance with the notification instructions, the MID 28 displays again the image 96a of the speed limit information, 40 km/h, as shown in FIG. 8 (step S18).

[3-3. Third Processing]

The regulatory information notifying device 48 is capable of executing later-described third processing instead of the above-described first and second processing.

The third processing is to notify the occupant of the speed limit information (regulatory information) detected by the road-to-vehicle communication with priority to the speed limit information (regulatory information) detected by image capturing. Further, the third processing is to notify the occupant of the vehicle information and traffic light information. Hereinafter, a procedure of the third processing is described with reference to FIG. 9. A sequential processing described below may be executed periodically or at a predetermined timing such as the timing when the regulatory information is detected by the camera 36 and/or the radio receiver 44. In addition, the sequential processing may be executed at the timing when the vehicle 10 is out of the effective section of the regulatory information detected by either the camera 36 or the radio receiver 44.

Figure 9:
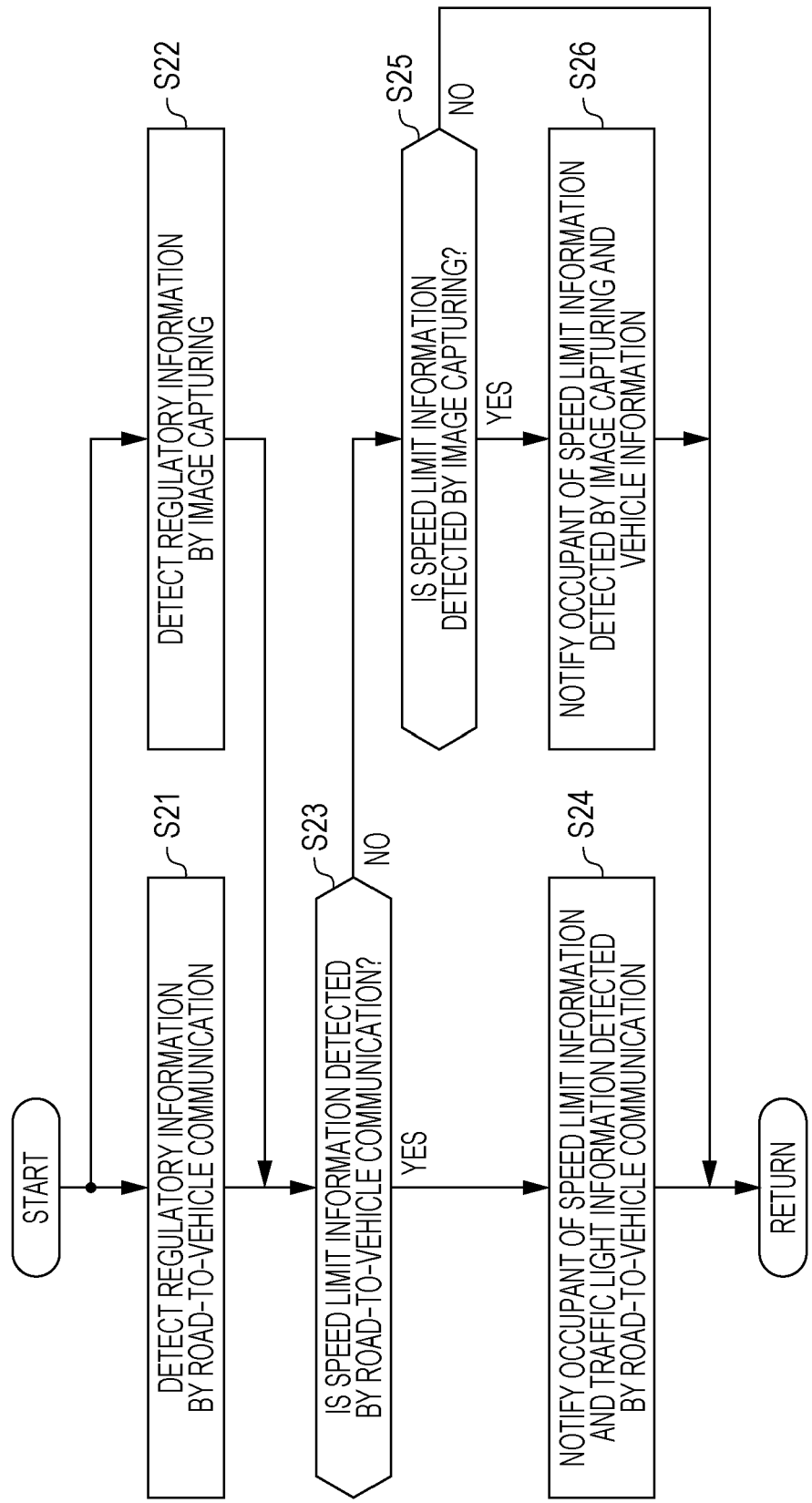
FIG. 9 is a flowchart of a regulatory information notification processing according to a third processing.

In the sequential processing shown in FIG. 9, the processing in steps S21 to S23 and S25 is the same as the processing in steps S1 to S3 and S5 of the first processing shown in FIG. 3. Thus, detailed description of the processing that is the same as the first processing is omitted. Information displayed in processing in steps S24 and S26 is a feature of the third processing.

The regulatory information is detected in each of steps S21 and S22, and whether or not the speed limit information is detected by the road-to-vehicle communication is determined in step S23. When the speed limit information is detected by the road-to-vehicle communication (step S23: YES), the processing proceeds to step S24. On the other hand, when no speed limit information is detected by the road-to-vehicle communication (step S23: NO), the processing proceeds to step S25.

In step S24, the speed limit information and the traffic light information detected by the road-to-vehicle communication are notified. The regulatory information detected by the radio receiver 44 includes the traffic light information of a traffic light placed after the radio transmitter 46 in addition to the speed limit information. Regardless of whether or not the speed limit information is detected by the image information identifying unit 58, the notification processing unit 72 determines to notify the occupant of the speed limit information and the traffic light information detected by the radio receiver 44 with priority. Responding to the determination result of the notification processing unit 72, the instructing unit 74 outputs the notification instructions to the notifying unit 78. In accordance with the notification instructions output by the instructing unit 74, the MID 28 of the notifying unit 78 displays the speed limit information and the traffic light information detected by the radio receiver 44. In other words, the MID 28 displays the sign image indicating the speed limit information and an image indicating the signal state of the traffic light on the screen. The speaker 32 outputs the speed limit and the signal state of the traffic light with the voice.

In step S25, whether or not the speed limit information is detected by image capturing is determined. When the speed limit information is detected by image capturing (step S25: YES), the processing proceeds to step S26. On the other hand, when no speed limit information is detected by image capturing (step S25: NO), the sequential processing is once terminated.

In step S26, the speed limit information detected by image capturing and the vehicle information is notified. The notification processing unit 72 determines to notify the occupant of the speed limit information detected by the camera 36 and the vehicle information detected by sensors such as the vehicle speed sensor 50 and the yaw rate sensor 52. Responding to the determination result of the notification processing unit 72, the instructing unit 74 outputs the notification instructions to the notifying unit 78. In accordance with the notification instructions output by the instructing unit 74, the MID 28 displays the speed limit information detected by the camera 36 and the vehicle information. In other words, the MID 28 displays the sign image indicating the speed limit information and an image indicating the vehicle information (such as the vehicle speed and the yaw rate) on the screen. The speaker 32 outputs the speed limit and the information such as the vehicle speed and the yaw rate with the voice.

When the processing in steps S21 to S26 terminates, the processing returns to step S21 and the sequential processing is repeated.

[3-3-1. Specific Example 5]

Figure 10:
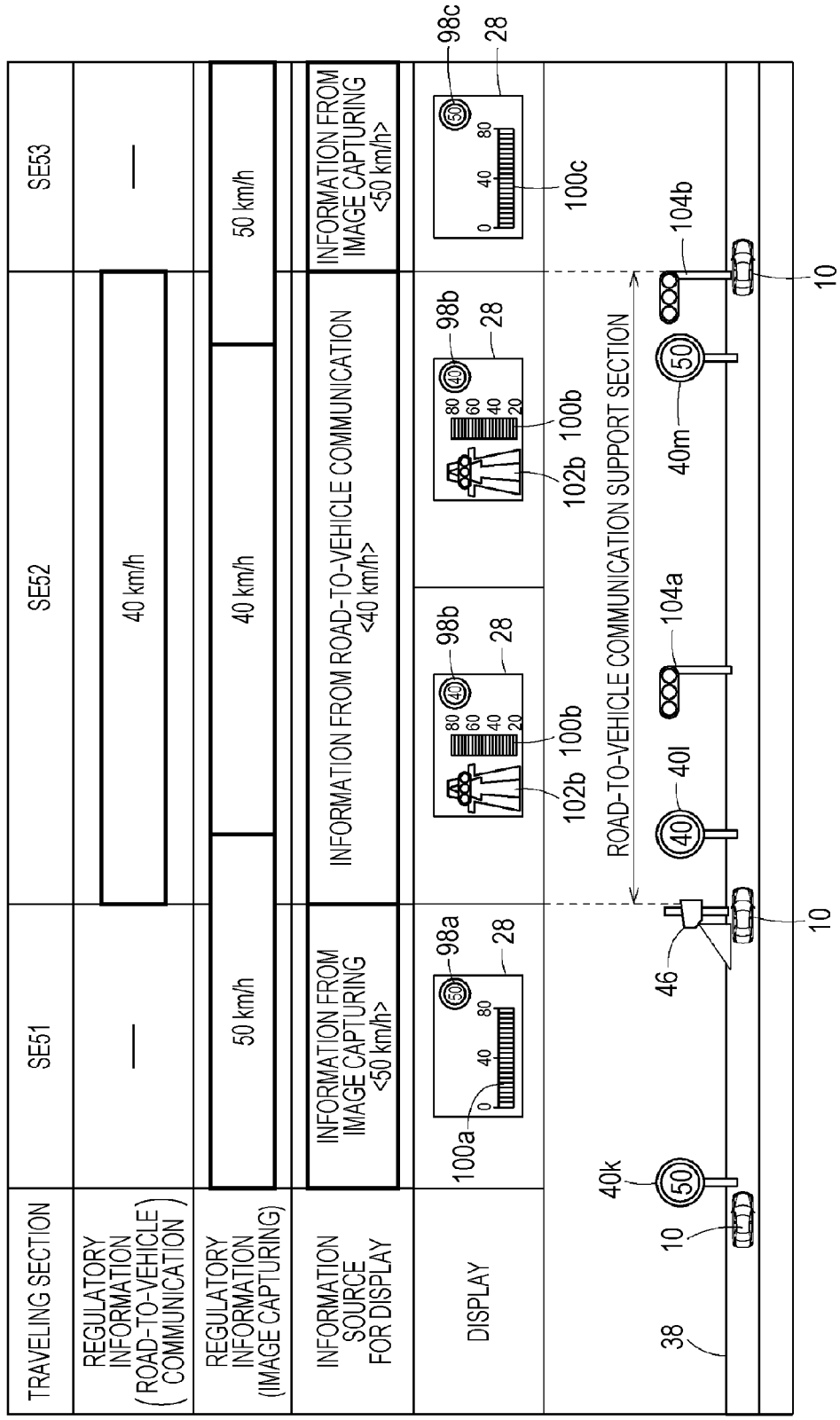
FIG. 10 is a diagram illustrating a state of a specific example 5.

A specific example 5 of the third processing is described with reference to FIG. 10, and FIGS. 2 and 9 when necessary. The specific example 5 uses the MID 28 as the notifying unit 78. As shown in FIG. 10, road signs 40k to 40m respectively indicating the speed limits, the radio transmitter 46, and the traffic lights 104a and 104b are placed at the roadway 38. The road sign 40k, which indicates the speed limit of 50 km/h, is placed near a start point of a section SE51. The road sign 40l, which indicates the speed limit of 40 km/h, is placed near a start point of a section SE52. The road sign 40m, which indicates the speed limit of 50 km/h, is placed near an end point of the section SE52. The radio transmitter 46 is placed at the start point of the section SE52. Further, the traffic lights 104a and 104b are placed at the section SE52. The section SE52 is the support section of the road-to-vehicle communication, that is, the effective section of the speed limit information transmitted from the radio transmitter 46.

In the following description, the MID 28 displays images 100a to 100c, which respectively indicate the vehicle speeds from the vehicle information, in accordance with the operation of the switch SW (see FIG. 1). In accordance with the operation of the switch SW, the MID 28 may display another type of vehicle information such as the yaw rate, the fuel consumption, the driving time, the various traveled distances, the drivable range, and the drive mode.

When the vehicle 10 travels before the start point of the section SE51 of the roadway 38, the camera 36 captures an image including the road sign 40k. The image information identifying unit 58 then identifies the speed limit information, which is 50 km/h, indicated by the road sign 40k (step S22). At this moment, no speed limit information is detected by the road-to-vehicle communication (step S23: NO). Thus, the notification processing unit 72 determines to display the speed limit information, 50 km/h, detected by the camera 36, and the vehicle information selected by the occupant (vehicle speed) (step S25: YES). Responding to the determination result of the notification processing unit 72, the instructing unit 74 outputs the notification instructions to the MID 28. In accordance with the notification instructions, the MID 28 displays an image 98a of the speed limit information, 50 km/h, and the image 100a indicating the vehicle speed next to each other as shown in FIG. 10 (step S26).

When the vehicle 10 reaches the start point of the section SE52 of the roadway 38, the radio receiver 44 receives the signal transmitted from the radio transmitter 46. The radio information identifying unit 66 then identifies the speed limit information, which is 40 km/h, and the traffic information, which indicates the signal state of the traffic light 104a, transmitted from the radio transmitter 46 (step S21). At this moment, the speed limit information, 50 km/h, is already detected by the camera 36 at the section SE51. The notification processing unit 72 determines to display the speed limit information, 40 km/h, detected by the radio receiver 44 with priority to the speed limit information, 50 km/h, detected by the camera 36 (step S25: YES). Further, the notification processing unit 72 determines to display the traffic light information detected by the radio receiver 44 and the vehicle information selected by the occupant (vehicle speed). Responding to the determination result of the notification processing unit 72, the instructing unit 74 outputs the notification instructions to the MID 28. In accordance with the notification instructions, the MID 28 displays an image 98b of the speed limit information, which is 40 km/h, the image 100b indicating the vehicle speed, and an image 102b indicating the signal state of the traffic light next to each other as shown in FIG. 10 (step S24). In this case, the MID 28 switches a display mode of the image 100a indicating the vehicle speed to a display mode of the image 100b indicating the vehicle speed.

When the vehicle 10 passes through the start point of the section SE52 of the roadway 38, the camera 36 captures an image including the road sign 40l. When the vehicle 10 travels near the end point of the section SE52 of the roadway 38, the camera 36 captures an image including the road sign 40m. However, the section SE52 is within the effective section of the speed limit information, 40 km/h, detected by the radio information identifying unit 66. Thus, the notification processing unit 72 determines to display the speed limit information, 40 km/h, detected by the radio information identifying unit 66 with priority to the speed limit information, 40 km/h and 50 km/h, detected by the image information identifying unit 58 (step S23: YES). Further, the notification processing unit 72 determines to display the traffic light information detected by the radio receiver 44 and the vehicle information selected by the occupant (vehicle speed). The MID 28 keeps displaying the image 98b of the speed limit information, which is 40 km/h, the image 100b indicating the vehicle speed, and the image 102b indicating the signal state of the traffic light (step S24).

When the vehicle 10 passes through the end point of the section SE52 of the roadway 38 and travels into a section SE53, the vehicle 10 is out of the effective section of the speed limit information, 40 km/h, detected by the radio receiver 44. At this moment, the speed limit information, which is 50 km/h, indicated by the road sign 40*m* is already detected by image capturing (step S23: NO). Thus, the notification processing unit 72 determines to display the speed limit information, 50 km/h, detected by the camera 36 and the vehicle information selected by the occupant (vehicle speed) (step S25: YES). Responding to the determination result of the notification processing unit 72, the instructing unit 74 outputs the notification instructions to the MID 28. In accordance with the notification instructions, the MID 28 displays an image 98*c* of the speed limit information, 50 km/h, and the image 100*c* indicating the vehicle speed next to each other as shown in FIG. 10 (step S26). In this case, the MID 28 switches the display mode of the image 100*b* indicating the vehicle speed to a display mode of the image 100*c* indicating the vehicle speed.

[4. Summary of Present Embodiment]

The regulatory information notifying device 48 according to the present embodiment includes: the regulatory information detecting unit that detects the regulatory information presented on the roadway 38 in front of the vehicle 10; the notifying unit 78 that notifies the occupant of the regulatory information detected by the regulatory information detecting unit; and the ECU 56 (controlling unit) that controls the notifying unit 78. The regulatory information detecting unit includes the camera 36 (image capturing and detecting unit) that captures the image of ahead of the vehicle 10 and detects the regulatory information, and the radio receiver 44 (communication detecting unit) that receives the signal transmitted from outside the vehicle 10 and detects the regulatory information. For example, as shown in FIG. 4, when the radio receiver 44 detects the regulatory information, the MID 28 included in the notifying unit 78 displays the image 90*b* of the speed limit information (regulatory information) detected by the radio receiver 44 in accordance with the instructions of the ECU 56 (instructing unit 74). When the radio receiver 44 detects no regulatory information, the MID 28 displays the images 90*a* and 90*c* of the speed limit information (regulatory information) detected by the camera 36 in accordance with the instructions of the ECU 56 (instructing unit 74).

In other words, when both the camera 36 and the radio receiver 44 detect the regulatory information, the notification processing unit 72 of the ECU 56 determines to display the regulatory information detected by the radio receiver 44 with priority. Then, responding to the determination result of the notification processing unit 72, the instructing unit 74 outputs the display instructions to the MID 28.

According to the present embodiment, when the road-to-vehicle communication, that is, the radio receiver 44 detects the regulatory information, the regulatory information detected by the radio receiver 44 is displayed with priority. On the other hand, when the radio receiver 44 detects no regulatory information, the regulatory information detected by the camera 36 is displayed. In this way, appropriate regulatory information can be continuously notified to the occupant.

In the present embodiment, out of the regulatory information, the camera 36 and the radio receiver 44 detect the speed limit information indicating the speed limit of the roadway 38 and the other regulatory information other than the speed limit information. For example, as shown in FIG. 5, when the radio receiver 44 detects the speed limit information, the MID 28 concurrently displays the image 92*f* of the speed limit information detected by the radio receiver 44 and the image 92*e* of the other regulatory information detected by the camera 36 in accordance with the instructions of the ECU 56 (instructing unit 74). On the other hand, when the radio receiver 44 detects no speed limit information, the MID 28 displays the image 92*d* of the speed limit information and the image 92*c* of the other regulatory information detected by the camera 36 in accordance with the instructions of the ECU 56 (instructing unit 74).

Regarding the speed limit information, the information accuracy of the displayed speed limit can be enhanced by displaying the speed limit information detected by the radio receiver 44 with priority to the speed limit information detected by the camera 36, as in the present embodiment. In addition, regarding the other regulatory information other than the speed limit information, the regulatory information can be displayed at an appropriate position with no delay by displaying the regulatory information in front of the vehicle 10 detected by the camera 36.

In the present embodiment, the radio receiver 44 detects the speed limit information by executing the road-to-vehicle communication with the radio transmitter 46 previously placed at the roadway 38. When the radio receiver 44 detects the speed limit information, in accordance with the instructions of the ECU 56 (instructing unit 74), the MID 28 does not display the other regulatory information that is part of the other regulatory information detected by the camera 36 and is not presented on the roadway 38 at which the radio receiver 46 is placed. For example, as shown in FIG. 7, the road sign 40*h* of stop placed at the side road 110 is not displayed.

According to the present embodiment, when the radio receiver 44 detects the speed limit information, the other regulatory information, such as the stop information, that is part of the other regulatory information detected by the camera 36 and is not presented on the roadway 38 at which the radio transmitter 46 is placed is not displayed. This can prevent displaying wrong information induced by misidentification of the road sign 40*h* for the side road 110 as a road sign for the roadway 38. Further, strangeness of the occupant can be reduced.

In addition, for example, as shown in FIG. 10, out of the regulatory information, the radio receiver 44 detects the speed limit information indicating the speed limit of the roadway 38 and the traffic light information indicating the signal state of the traffic lights 104*a* and 104*b* in front of the vehicle 10 by executing the road-to-vehicle communication with the radio transmitter 46 previously placed at the roadway 38. When the radio receiver 44 detects no speed limit information and the traffic light information, the MID 28 displays the images 98*a* and 98*c* of the speed limit information (regulatory information) detected by the camera 36 and the images 100*a* and 100*c* of the vehicle speed information (vehicle information) set by the occupant in accordance with the instructions of the ECU 56 (instructing unit 74). When the radio receiver 44 detects the speed limit information and the traffic light information, the MID 28 displays the image 98*b* of the speed limit information detected by the radio receiver 44 and the image 102*b* of the traffic light information in accordance with the instructions of the ECU 56 (instructing unit 74).

According to the present embodiment, the speed limit information and the traffic light information detected by the radio receiver 44 can be displayed with priority, and thereby the occupant can be alerted by the information with high accuracy.

What is claimed is:

1. A regulatory information notifying device comprising:
   a regulatory information detecting unit configured to detect regulatory sign or traffic information existing on a roadway in front of a vehicle having an occupant, the regulatory information detecting unit comprising,
an image capturing unit configured to capture an image ahead of the vehicle to detect the regulatory sign or traffic information from the image, and
a communication unit configured to receive a signal transmitted from an outside of the vehicle to detect the regulatory sign or traffic information from the transmitted signal;
a notifying unit configured to notify the occupant of the regulatory sign or traffic information detected by the regulatory information detecting unit; and
a controlling unit configured to control the notifying unit and to determine whether or not the communication unit is detecting the regulatory sign or traffic information, wherein
when it is determined that regulatory sign or traffic information is detected by the communication unit, the notifying unit is controlled to notify the occupant of the regulatory sign or traffic information detected by the communication unit, and
when it is determined that regulatory sign or traffic information is detected by the image capturing unit, while any regulatory sign or traffic information which corresponds to the regulatory sign detected by the image capturing unit is not detected by the communication unit, the notifying unit is controlled to notify the occupant of the regulatory sign or traffic information detected by the image capturing unit.

2. The regulatory information notifying device according to claim 1, wherein
out of the regulatory sign or traffic information, the image capturing unit and the communication unit detect (i) speed limit information indicating a speed limit of the roadway and (ii) other regulatory sign or traffic information other than the speed limit information, and
when it is determined that the speed limit information is detected by the communication unit, the notifying unit is controlled to notify the occupant of the speed limit information detected by the communication unit and to notify the occupant of the other regulatory sign or traffic information by the image capturing unit, and
when it is determined that the speed limit information is not detected by the communication unit, the notifying unit is controlled to notify the occupant of the speed limit information and the other regulatory sign or traffic information detected by the image capturing unit.

3. The regulatory information notifying device according to claim 2, wherein
the communication unit detects the speed limit information by executing road-to-vehicle communication with a wireless transmitter provided on the roadway, and
when it is determined that the speed limit information is detected by the communication unit, the notifying unit is controlled not to notify the occupant of the other regulatory sign or traffic information detected by the image capturing unit if the other regulatory sign or traffic information is not existing on the roadway on which the wireless transmitter is placed.

4. The regulatory information notifying device according to claim 3, wherein the other regulatory sign or traffic information includes information regarding a stop sign detected by the image capturing unit,
when it is determined that the speed limit information is detected by the communication unit, the notifying unit is controlled not to notify the occupant of the other regulatory sign or traffic information regarding the stop sign.

5. The regulatory information notifying device according to claim 1, wherein
the notifying unit comprises a display unit that displays the regulatory sign or traffic information detected by the image capturing unit or the communication unit and displays a predetermined kind of vehicle information set by the occupant,
the communication unit configured to execute road-to-vehicle communication with a wireless transmitter provided on the roadway to detect speed limit information indicating a speed limit of the roadway and traffic light information indicating a signal state of a traffic light in front of the vehicle from the regulatory sign or traffic information, and
when it is determined that neither of the speed limit information nor the traffic light information is detected by the communication unit, the display unit of the notifying unit is controlled to display the regulatory sign or traffic information detected by the image capturing unit and the vehicle information set by the occupant, and
when it is determined that each of the speed limit information and the traffic light information is detected by the communication unit, the display unit of the notifying unit is controlled to display the speed limit information and the traffic light information detected by the communication unit.

6. A regulatory information notifying method comprising:
image capturing and sign detecting steps of capturing an image ahead of a vehicle having an occupant and detecting the regulatory sign or traffic information existing on a roadway from the image;
communication and sign detecting steps of receiving a signal transmitted from an outside of the vehicle and detecting the regulatory sign or traffic information from the signal;
a first notifying step of notifying the occupant of the regulatory sign or traffic information detected in the communication and sign detecting steps when the regulatory sign or traffic information is detected in the communication and sign detecting steps; and
a second notifying step of notifying the occupant of the regulatory sign or traffic information detected in the image capturing and sign detecting steps when any regulatory sign or traffic information which corresponds to the regulatory sign or traffic information detected in the image capturing and sign detecting steps is not detected in the communication and sign detecting steps.

7. A regulatory information notifying device comprising:
a regulatory information detector configured to detect regulatory sign or traffic information existing on a roadway in front of a vehicle having an occupant, the regulatory information detecting device comprising,
an image capturing device configured to capture an image ahead of the vehicle to detect the regulatory sign or traffic information from the image, and
a communicator configured to receive a signal transmitted from an outside of the vehicle to detect the regulatory sign or traffic information from the transmitted signal;
a notifying device configured to notify the occupant of the regulatory sign or traffic information detected by the regulatory information detector and a controller configured to control the notifying unit and to determine whether or not the communicator is detecting the regulatory sign or traffic information, wherein when it is determined that regulatory sign or traffic information is detected by the communication unit, the notifying device is controlled to notify the occupant of the regulatory sign or traffic information detected by the communicator, and when it is determined that regulatory sign or traffic information is detected by the image capturing device, while any regulatory sign or traffic information which corresponds to the regulatory sign detected by the image capturing device is not detected by the communicator, the notifying device is controlled to notify the occupant of the regulatory sign or traffic information-detected by the image capturing device.

* * * * *